W. G. MILLER, Jr.
FLUSHING VALVE.
APPLICATION FILED MAY 25, 1909.

981,212.

Patented Jan. 10, 1911.
2 SHEETS—SHEET 1.

Witnesses:

Inventor
William G. Miller, Jr.
by W. G. Doolittle
Attorney

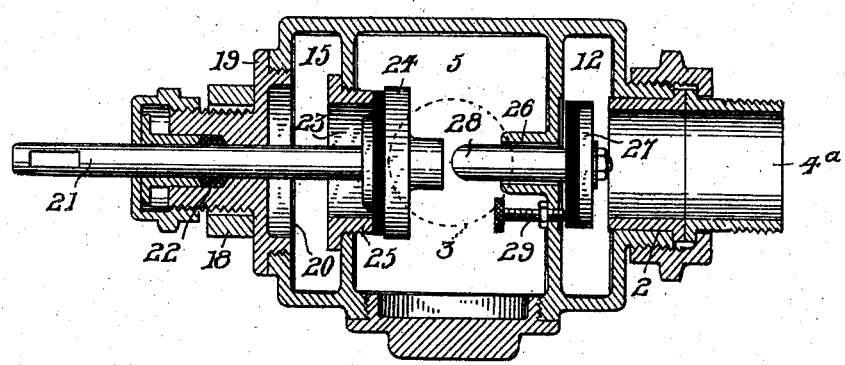
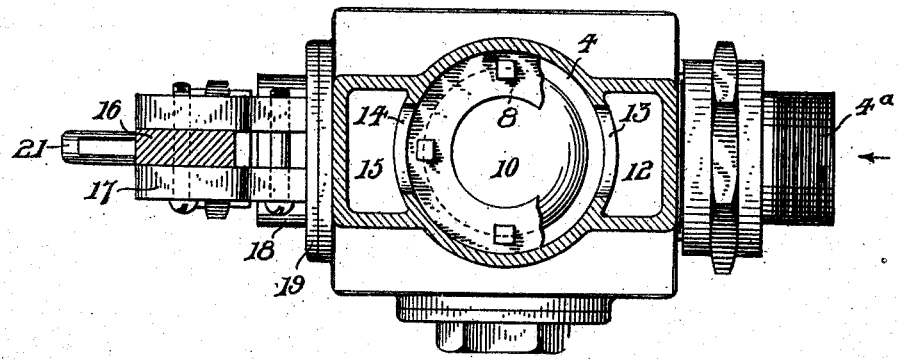
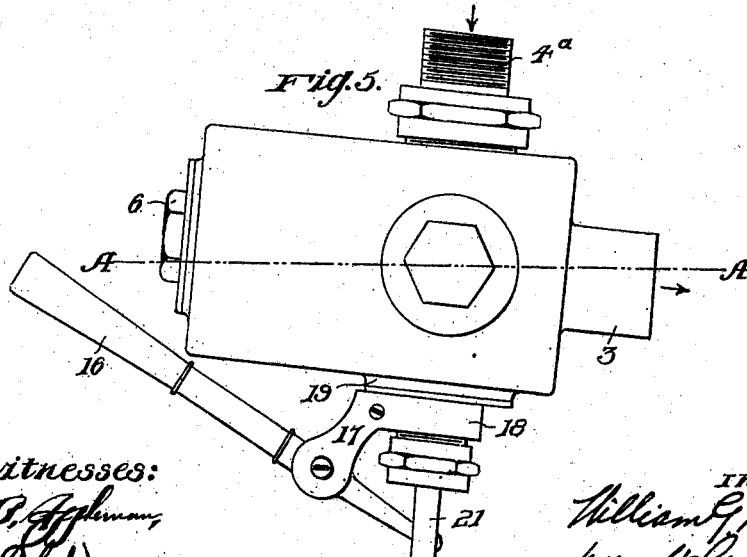

UNITED STATES PATENT OFFICE.

WILLIAM G. MILLER, JR., OF PITTSBURG, PENNSYLVANIA.

FLUSHING-VALVE.

981,212.  Specification of Letters Patent.  Patented Jan. 10, 1911.

Application filed May 25, 1909. Serial No. 498,312.

*To all whom it may concern:*

Be it known that I, WILLIAM G. MILLER, Jr., a resident of Pittsburg, in the county of Allegheny and State of Pennsylvania, have invented certain new and useful Improvements in Flushing-Valves, of which the following is a specification.

My invention relates to a new and improved flushing-valve or a flushometer designed to be directly applied to or connected with a water service pipe leading to a source of water supply under pressure, such for example as a city water supply system. My invention, however, may be employed with water-supply tanks from which water under pressure is conveyed to the valve.

My invention is primarily adapted for controlling the flow of water under pressure from water service-pipes and tanks for flushing purposes; and an object of my invention is the provision of a simple and efficient valve-mechanism capable of being successfully operated under the varying conditions to which valves of this class are subjected in service.

Figure 1:
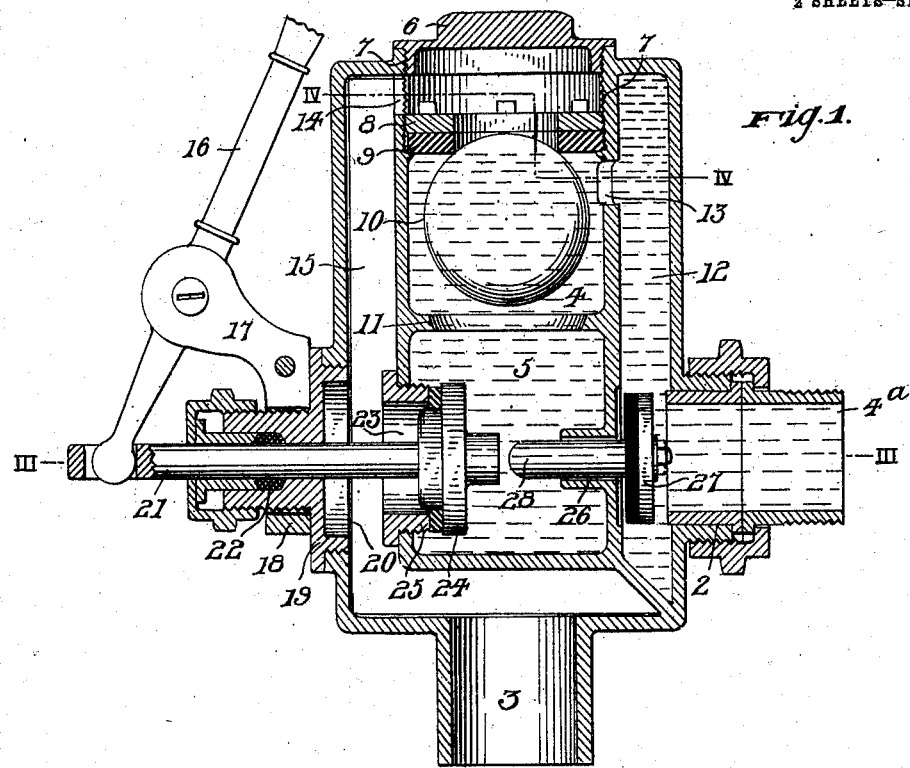
Figure 2:
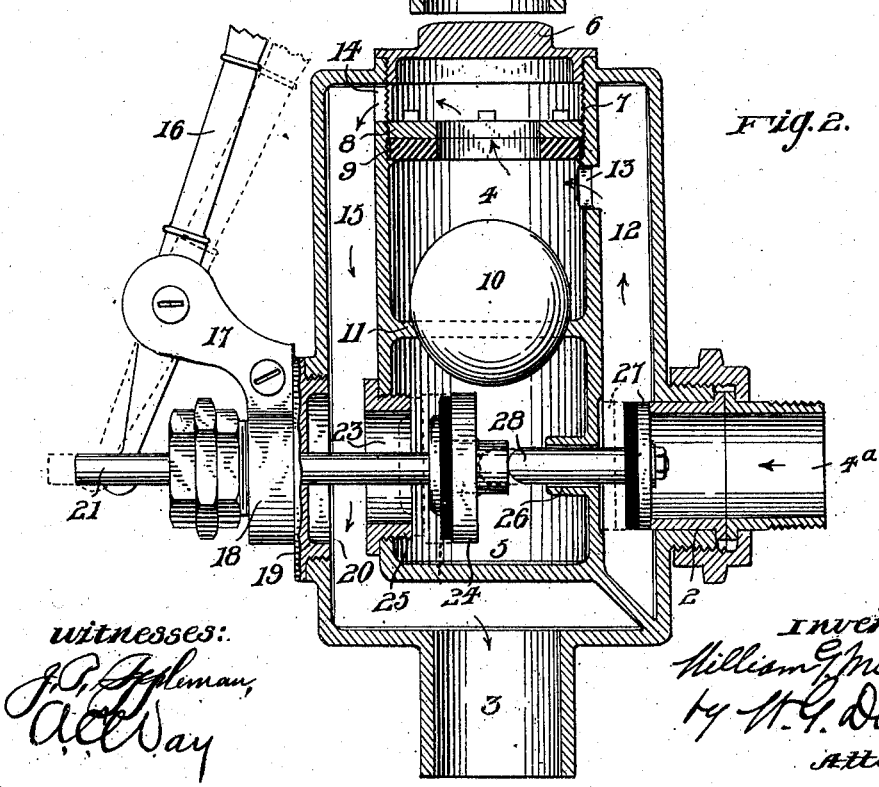

In the accompanying drawings, which illustrate an application of my invention, Figure 1, is a central vertical sectional view of a valve-mechanism embodying my invention; Fig. 2 is a view similar to Fig. 1, showing the movable parts in different positions; Fig. 3 a horizontal sectional view taken on line III—III of Fig. 1; Fig. 4, a part plan and a part sectional view, the section being taken on line IV—IV of Fig. 1; and Fig. 5, an elevational view of the valve-mechanism with the valve-casing disposed in an inclined plane.

As illustrated and as preferred, the valve-casing or body consists of an integral metallic structure formed with a fluid supply inlet opening or passage 2, and a discharge opening or passage 3. The supply inlet opening is shown coupled up with a pipe 4ª, which latter leads to a source of water under pressure.

The interior of the casing is divided by suitable walls into a valve-chamber 4 and a fluid equalizing chamber 5. The upper end of valve-chamber is closed by a threaded cap 6, the threads of which are adapted to engage threads 7, formed on the interior surface of a wall of the chamber. Located within chamber 4 and engaging the threads 7 is a metallic valve-seat 8 having a washer 9. Adapted to move in valve-chamber 4 is a ball-valve 10. Ball-valve 10 is designed to be normally maintained on its seat 8 by the water pressure in the system and when so seated prevents the passage of water from the supply inlet to the outlet. The limit of travel of valve 10 within its chamber is controlled by an annular seat or wall 11.

The interior of the valve-casing is in communication with the inlet supply by means of a passage 12 and a port 13 thereby permitting water under pressure to normally fill chambers 4 and 5 and bear upwardly against valve 10, thus maintaining the valve on its seat.

The wall of the upper portion of the valve-chamber above the valve-seat 8 is formed with a port 14 and in open communication with port 14 I provide a second passage 15 leading from said port downwardly to the discharge passage or outlet 3. Access to the interior of the valve-chamber 4 may be had by removing cap 6; thus permitting the valve-seat 8 and washer 9 to be drawn out from said chamber for the purpose of inserting a new washer when required.

The means employed in conjunction with the water pressure for operating the valve for flushing purposes as illustrated comprise an actuating lever or arm 16 pivoted to the arms 17 of a collar 18. Collar 18 is mounted on a threaded hub or sleeve of a cap 19, the latter being employed for closing the opening 20 of the casing. Lever 16 is joined at one end to an end of a valve-stem 21 projecting through a stuffing-box 22. Passage 15 is in communication with the equalizing chamber 5 by means of an opening 23 formed in a wall of said chamber and this opening is controlled by a valve 24 having its seat 25 projected through opening 23. Located directly opposite opening 23 of chamber 5 is a smaller opening 26 and this opening is controlled by a valve 27 having its stem 28 projecting inwardly through opening 26 and arranged in alinement with the stem 21 of valve 24. Valve 27 and its stem are designed to allow a slight leakage of water from the supply to the equalizing chamber and the amount of leakage is controlled by an adjusting screw 29.

The position of the parts as shown by Fig. 1 is the normal position of the movable parts, and as shown and described, the pressure of water from the supply fills the valve and equalizing-chambers and maintains the valve proper on its seat, thereby cutting off the flow of water to the outlet passage. Upon a slight movement being given to the actuating lever 16 said lever will cause the valve-stem 21 to move inwardly and strike stem 28 forcing stem 28 in the same direction or into the position shown in full lines in Fig. 2.

Following the movement of the stems 21 and 28 it will be noted that both of the valves 24 and 27 are carried away from their respective seats and that valve 27 temporarily closes the inlet supply. The movement of the valve 24 from its seat permits an escape of water from the equalizing-chamber into passage 15, thus equalizing the pressure on both sides of the ball-valve or producing atmospheric pressure within the valve-casing. When this pressure is attained the valve 10 will drop from its seat 8 onto the annular projection 11 and the pressure of water acting against valve 27 moves said valve and allows water to pass to the outlet by way of passage 12, port 13, valve-chamber 4, port 14, and passage 15, as shown by the arrows in Fig. 2. The inward movement of the valve 27 and its stem causes the valve 24 to be moved against its seat, thus closing the port of the equalizing-chamber in communication with passage 15 and destroying the equalization of pressure.

The quantity of water employed for each flushing operation is regulated by the adjusting screw 29 acting against valve 27 in such a manner as to increase or diminish the rate of admission of water to the equalizing-chamber from the inlet. During the operation of flushing as above described water under pressure is being admitted to equalizing-chamber 5 and the pressure on both sides of the valve first becomes equalized or balanced, then the pressure in chamber 5 surpasses the pressure in chamber 4 and when this occurs valve 10 will move upwardly and against its seat, thereby cutting off the supply of water to the discharge or outlet passage 3. After valve 10 reaches its seat it is maintained thereon by the pressure of water from the service pipe and the movable parts are again in the position shown by Fig. 1.

By means of the construction described, I am enabled to utilize the water pressure of the service pipe or the pressure of water contained in a tank for maintaining the valve 10 on its seat, also to equalize the pressure on both sides of the valve, whereby the valve is unseated and further to again equalize the pressure during the operation of flushing and to utilize the flow of water through the valve-casing for reseating the valve 10 and cutting off the supply to the outlet or discharge.

What I claim is:

1. A flushing-valve comprising a casing having an inlet-opening and a discharge-opening, a valve controlling the passage of fluid from the inlet to the discharge, a valve-chamber, an equalizing-chamber, a passage leading from the inlet to the valve-chamber, a passage connecting the valve-chamber and the discharge-opening, a port forming a communication between the inlet and the equalizing-chamber, a valve controlling said port and adapted to close the inlet, a port forming communication between the equalizing-chamber and the passage leading to the discharge, and a valve controlling the last mentioned port.

2. A flushing-valve comprising a casing having an inlet-opening and a discharge-opening, a valve controlling the passage of fluid from the inlet to the discharge normally seated by the pressure of fluid in the inlet, and means acting to close the inlet and to balance the pressure in the casing to unseat the valve, to permit the passage of fluid from the inlet to the discharge.

3. A flushing-valve comprising a casing having an inlet-opening and a discharge-opening, a valve controlling the passage of fluid from the inlet to the discharge normally seated by the pressure of fluid in the inlet, and means acting to close the inlet-opening and to simultaneously equalize the pressure within the casing.

4. A flushing-valve comprising a casing having an inlet-opening and a discharge-opening, a valve-chamber, a removable valve-seat, a ball-valve normally seated by the pressure of fluid in the inlet, an equalizing-chamber, and means acting to equalize the pressure to unseat the valve, to permit the flow through the casing, and for gradually and automatically raising the pressure in the equalizing-chamber in excess of the pressure in the valve-chamber to reseat the valve.

5. The combination with a water-service-pipe adapted to deliver water under pressure to a valve-casing, of a flushing-valve comprising a casing having an inlet opening in communication with the service-pipe, a discharge-opening, a weighted-ball-valve controlling the passage of water through the casing, and means acting to effect an equalization of pressure on both sides of the valve to unseat the valve and during the flushing period to raise the pressure back of the valve to automatically effect a reseating of the valve.

6. In a flushing apparatus, a fluid inlet, a fluid discharge, a valve-chamber, a valve controlling the passage of fluid from the inlet to the discharge normally seated by the pressure of fluid in the inlet, an equalizing-chamber, and means acting to equalize the pressure in the chamber to open the valve and then for gradually raising the pressure in the equalizing chamber in excess of the pressure in the valve-chamber to automatically close the valve.

In testimony whereof I affix my signature in presence of two witnesses.

WILLIAM G. MILLER, Jr.

Witnesses:
 A. C. WAY,
 W. G. DOOLITTLE.